W. D. FORBES.
Shaft-Coupling.
No. 215,345. Patented May 13, 1879.
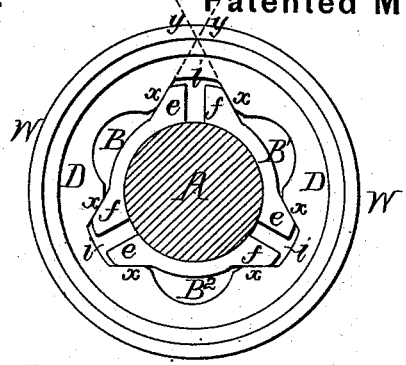
Fig. 2.
Fig. 1.
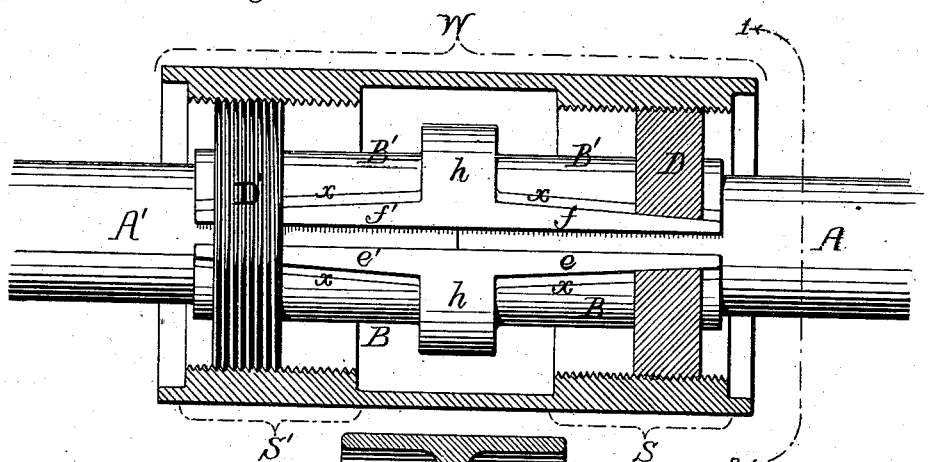
Fig. 3.
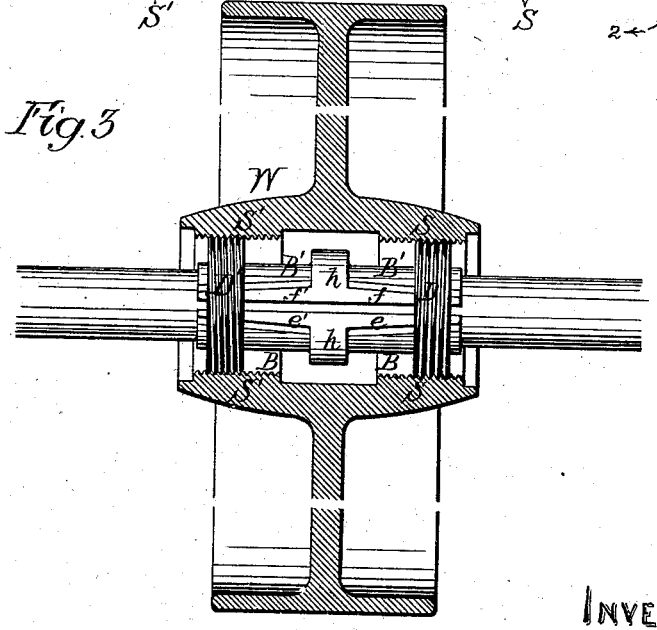
Witnesses
Henry Howson Jr.
Harry Smith
Inventor.
William D. Forbes
by his Attorneys
Howson and Son

UNITED STATES PATENT OFFICE.

WILLIAM D. FORBES, OF BUFFALO, NEW YORK.

IMPROVEMENT IN SHAFT-COUPLINGS.

Specification forming part of Letters Patent No. 215,345, dated May 13, 1879; application filed April 17, 1879.

*To all whom it may concern:*

Be it known that I, WILLIAM D. FORBES, of Buffalo, New York, have invented a new and useful Improvement in Couplings and in Securing Wheels and Pulleys to Shafts, of which the following is a specification.

My invention consists of an improvement, fully described hereinafter, in the shaft-coupling for which Letters Patent No. 212,547 were granted to me on the 25th day of February, 1879, my improvements being also applicable to wheels and pulleys as a means of securing the same to shafts.

In the accompanying drawings, Figure 1 is a longitudinal view, partly in section, of the coupling device; Fig. 2, a transverse section on the line 1 2; and Fig. 3 shows my invention as applied to the securing of a wheel or pulley to a shaft.

In Figs. 1 and 2, A and A' represent portions of two shafts to be coupled together; and B, B', and B", three clamping-plates adapted to the shafts. Each clamping-plate has on one edge two ribs, $e\ e'$, and on the other edge two similar ribs, $f f'$, all the ribs preferably terminating in a central enlargement, $h$, the object of which is to add strength to the plate. Each rib is made on a taper, being inclined on its inner edge, $x$, so that when the plates are fitted to the shaft, as shown in Fig. 1, the rib $e$ of one plate, B, and the rib $f$ of an adjoining plate, B', will form, together, a wedge-shaped projection, beveled at the edges, as indicated by the dotted lines $y\ y$, Fig. 2. This tapering and beveled projection is adapted to a slot, $i$, in the ring D, the latter having two additional slots for the two remaining tapering projections. In like manner the ribs $e'$ and $f'$ of adjacent plates constitute a wedge-shaped projection adapted to a slot in the ring D', which has two additional slots for the other projections.

These clamping-plates are shown and described in my aforesaid patent, in which, however, bolts passed through the rings D D', so that on tightening these bolts the rings were made to approach each other, and all three clamping-plates were thereby simultaneously bound to the two shafts A A'. In my present improvement, however, a screw-thread is cut on the periphery of each ring, the thread of one ring being right-handed, and that of the other ring left-handed.

A casing or cylinder, W, is contracted internally at two points, S S', and in the contracted portion S is cut an internal screw-thread, corresponding with the thread of the ring D, the other contracted portion being threaded internally to accord with the thread of the ring D'. On turning the cylinder W in one direction the rings will be moved apart from each other, and the shafts will be released from the clamping-plates; but on moving the cylinder in a contrary direction the rings will approach each other, and the clamping-plates will consequently be made to tightly embrace the shafts.

The cylinder W may form the hub of a wheel or pulley, as shown in Fig. 3; but it should be understood that when my invention has to be applied to the securing of wheels or pulleys to shafts, the torsion on the wheel or pulley must be in a direction which tends to move the rings toward each other, so that the greater the force transmitted through the wheel or pulley the greater will be its tendency to tighten the hub to the shaft.

I claim as my invention—

The combination of a shaft or shafts and any desired number of the within-described clamping-plates with rings D D', one having a right-handed and the other a left-handed screw-thread, and with a cylinder or casing, W, or hub of a wheel or pulley, threaded internally to accord with the threads on the rings, all substantially as set forth.

In testimony whereof I have signed my name to this specification in the presence of two subscribing witnesses.

WILLIAM D. FORBES.

Witnesses:
 CHARLES CARY,
 A. B. KELLOGG.